United States Patent [19]
Akiyama

[11] 3,806,154
[45] Apr. 23, 1974

[54] MOTOR VEHICLE SAFETY DEVICE

[75] Inventor: Yoshinori Akiyama, Yokohama, Japan

[73] Assignee: Nissan Motor Company Limited, Kanagawa-ku, Yokohama City, Japan

[22] Filed: May 23, 1972

[21] Appl. No.: 256,152

[30] Foreign Application Priority Data
Nov. 24, 1971 Japan................................ 46-93704

[52] U.S. Cl............................................. 280/150 B
[51] Int. Cl............................................. B60r 21/08
[58] Field of Search.................... 280/150 B; 180/90

[56] References Cited
UNITED STATES PATENTS
3,614,128  10/1971  Sobkow ................................. 180/90
3,224,924  12/1965  Von Ardenne ....................... 180/90
3,439,769  4/1969  Brilmyer ............................... 180/90
2,624,596  1/1953  Clingman ....................... 280/150 B
2,626,163  1/1953  Scantlebury..................... 280/150 B Primary Examiner—Robert R. Song

[57] ABSTRACT

To protect the head as well as the breast and shoulders of a vehicle occupant during a frontal collision of a motor vehicle, a new safety device is proposed which has a collapsible hollow body in the form of a bellows, a cushioning pad surrounding the collapsible hollow body and camber means providing a camber at an upper portion of the cushioning pad. The device is usually mounted on an instrument panel of the motor vehicle. The cushioning pad is raised at its upper portion in unison with the camber means for receiving the occupant's head when the rear end portion of the cushioning pad is pressed upon and accordingly the hollow body is collapsed by the breast and shoulders of the occupant during the frontal collision.

16 Claims, 5 Drawing Figures

MOTOR VEHICLE SAFETY DEVICE

The present invention relates to safety devices for use in motor vehicles and, more particularly, to a safety device of the character which is adapted to protect and occupant of a motor vehicle from being injured at an upper part of his body, especially the head, during a frontal collision of the motor vehicle when the vehicle occupant is flung toward a windshield if the occupant is on a front seat.

When the frontal collision is encountered by the motor vehicle, the vehicle occupant is forwardly flung in a sitting posture approximately in parallel to an underbody of the motor vehicle, as is well known. The vehicle occupant is brought to a standstill when his breast is forced against an instrument panel if the occupant is on the front seat. Under this condition, the head of the occupant is further forced forward by reason of inertia and turns forwardly and downwardly about his neck, thus violently striking against the inner face of the windshield. The vehicle occupant is consequently seriously hurt at his head although he may be left intact at his breast and shoulders.

A relatively thick safety pad having a cushioning characteristics has recently been used to protect the vehicle occupant from being injured at the upper part of the vehicle occupant during a frontal collision. The safety pad of this nature is usually attached to the instrument panel located in front of the front seat of the motor vehicle so as to protect the front seat occupant or occupants from injury. For the reason noted above, such safety pad is conductive to the protection of the occupant's breast and also the shoulders but is practically useless for the protection of his head which is turned forwardly and downwardly in response to an appreciable impact. No protective means has thus far been used to prevent such danger on the vehicle occupant.

An object of the present invention is, therefore, to provide a motor vehicle safety device which is capable of protecting not only the breast and shoulders of the vehicle occupant but his head during a frontal collision of the motor vehicle when the vehicle occupant is forcefully flung forwardly.

Another object of the present invention is to provide such motor vehicle safety device which is simple in construction, easy to be installed on the motor vehicle and economical to manufacture.

The safety device to accomplish these objects of the present invention generally comprises collapsible means to be located in front of a vehicle occupant and collapsible forwardly of the motor vehicle when pressed upon by an upper part of the vehicle occupant during frontal collision, cushioning means attached to at least rear and upper portions of the collapsible means, and camber means mounted on the cushioning means and having an upward camber which is located over the upper portion of the collapsible means. When the collapsible means is collapsed forwardly by the upper part of the occupant's body, the camber means is warped upwardly together with a portion of the cushioning means which is attached thereto, so that cushioning means is raised in unison with the camber means from the upper portion of the contracted collapsible means for receiving the head of the occupant.

The objects, advantages and features of the safety device generally constructed in this manner will become more apparent from the following description taken in conjunction with the accompanying drawings, in which.

Figure 1:
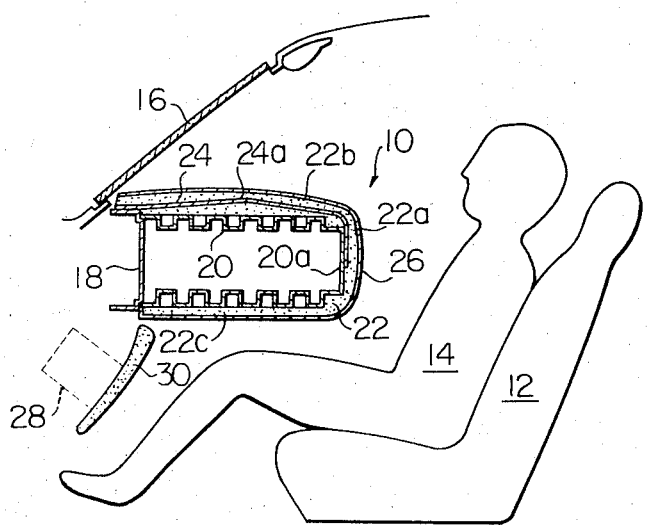
FIG. 1 is a sectional view of a preferred embodiment of the safety device according to the present invention, the safety device being shown as held inoperative and located in front of the front seat of the motor vehicle.

Reference is first had to FIG. 1 illustrating an overall construction of the safety device according to the present invention. The safety device, generally designated by reference numeral 10, is herein assumed as being mounted in front of a front seat 12 of the motor vehicle for the purpose of preventing a vehicle occupant 14 from being flung to a windshield 16 in the event the motor vehicle encounters a frontal collision during cruising. The safety device 10 is thus mounted on an instrument panel 18 which carries thereon various meters and controls as customary. It is, however, apparent that the safety device according to the safety device according to the present invention may be mounted, if desired, at the rear of the front seat 12 for the purpose of protecting a vehicle occupant or occupants on a rear seat, though not shown.

The safety device, as illustrated, includes a collapsible means which comprises a hollow body 20 in the form of bellows. The hollow body 20 in the bellows form is secured at its front end to the instrument panel 18 and rearwardly extend toward the front seat 12. A cushioning means which is in the form of a resilient pad 22 having a suitable thickness is attached to rear and upper portions of the collapsible hollow body 20, the rear and upper portions of the resilient pad being designated by reference numerals 22a and 22b, respectively, in FIG. 1. If desired, the resilient pad 22 may also be attached to an underside of the hollow body 20 for the protection of a lower part of the occupant's body 14, as indicated by reference numeral 22c. A camber means 24 is embedded in the upper portion 22b of the resilient pad 22, having its rear end attached to a rear wall portion 20a of the hollow body 20. This camber means 24 has a camber which is directed upwardly and which is located over the upper portion of the hollow body 20 as indicated at 24a. The resilient pad 22 is usually covered over its external surface by a wrapping member 26 which is also formed of a resilient material. If desired, an impact absorptive means 28 may be located below the instrument panel 18 for the protection of the occupant's knees when the occupant 14 is flung forward in a sitting posture. This impact absorptive means 28 is shown as being provided with a resilient pad 30 which is attached to the end of the means 28.

Figure 2:
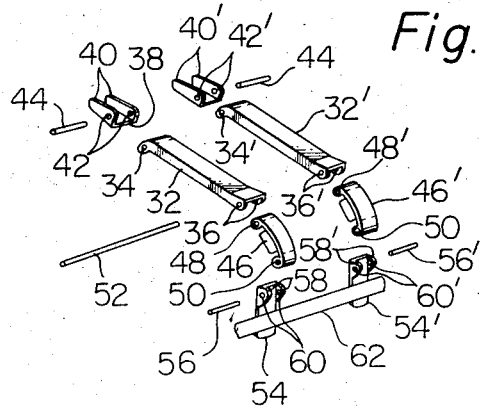
FIG. 2 is an exploded perspective view showing a preferred form of the camber means forming port of the device shown in FIG. 1.

A practical construction, in a preferred form, of the camber means 24 is now illustrated in FIG. 2.

Referring to FIG. 2, the camber means 24 includes a pair of spaced parallel strips 32 and 32' respectively having holes 34 and 34' formed at their front ends and holes 36 and 36' formed at their rear ends. These holes 34 and 34' and the holes 36 and 36' are aligned laterally of the safety device 10. A pair of front arm elements 38 and 38' having spaced side walls 40 and 40' and holes 42 and 42' formed therein are pivotally connected to the strips 32 and 32' by a pair of shafts 44 and 44', respectively, through the holes in the side walls 40 and 40' and the front holes 34 and 34' in the strips. A pair of rear arm elements 46 and 46' having front holes 48 and 48' and rear holes 50 and 50' are also pivotally connected to the strips 32 and 32' by a common shaft 52 through rear holes 36 and 36' in the strips and the front holes 48 and 48' in the arm elements 46 and 46', respectively. The rear arm elements 46 and 46' are connected to a pair of spaced mounts 54 and 54' by shafts 56 and 56' through the rear holes 50 and 50' and holes 58 and 58' formed in side projections 60 and 60' of the mounts 46 and 46', respectively. The front arm element 38 and 38' are secured to the front end portion of the hollow body 20 while the mounts 54 and 54' are secured to the rear end wall 20a of the hollow body 20 (FIG. 1). The strips 32 and 32' and rear arm elements 46 and 46' are pivotally connected to each other in a manner to have the strips and rear arm elements are directed upwardly toward their common ends so that the camber means 24 is bent upwardly at the shaft 52 connecting these strips and elements. In order that the camber means 24 be capable of receiving an impact efficiently at its right and left elements, a lateral strip or cross member 62 may preferably be attached to outer faces of the mounts 54 and 54' as illustrated. This lateral strip or cross member 62 may preferably formed of pliable metal.

Figure 3:
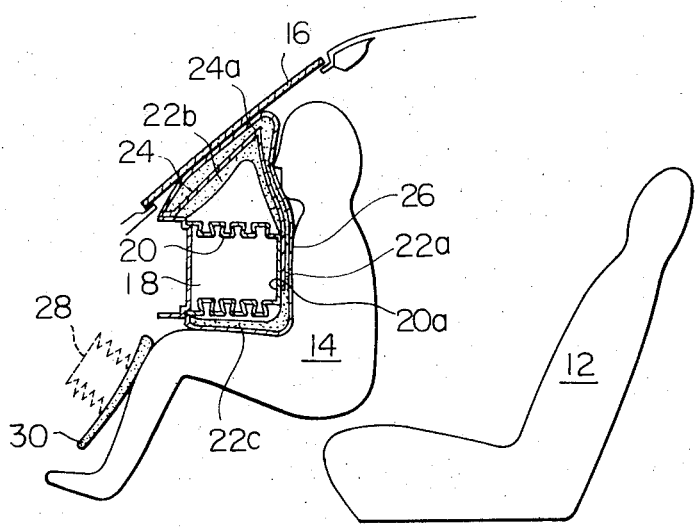
FIG. 3 is a view similar to FIG. 1 but now illustrates the safety device in an operative position.

When, now, the motor vehicle incorporating the safety device shown in FIGS. 1 and 2 encounters a collision at its front part, then the vehicle occupant 14 is forwardly flung from the seat 12 and strikes against the rear end of the safety device at his breast and also perhaps at his shoulders. As a consequence, the collapsible hollow body 20 is contracted toward the instrument panel 18 as illustrated in FIG. 3. The impact thus exerted on the safety device is transferred to the lateral strip or cross member 62 with the result that the shaft 52 intervening between the rear arm elements 46 and 46' and the strips 32 and 32' is urged upwardly by means of the camber 24a. The rear arm elements 46 and 46' are consequently turned upwardly about the shafts 56 and 56', respectively, thereby causing the resilient pad 22 to be deformed in a manner that the portion corresponding to the camber 24a is raised in unison with strips 32 and 32' and rear arm elements 46 and 46', as seen in FIG. 3. The portion of the resilient pad 22 having embedded therein the rear arm elements 46 and 46' is thus dislocated to a position intervening between the windshield 18 and the head of the occupant 14 who is being flung toward the windshield in the sitting posture approximately in parallel to the underbody of the motor vehicle. The resilient pad 22 then receives at this particular portion the occupant's head which is about to turn forwardly and downwardly while the portion of the resilient pad 22 corresponding to the strips 32 and 32' is forced against the windshield 18. The occupant 14 is in this manner protected from being seriously hurt at the head as well as at the breast and shoulders.

The resilient pad 22c attached to the underside of the hollow body 20 serves to prevent the vehicle occupant from being caused to float over the floor of the vehicle cabin while the resilient pad 30 of the impact absorptive means 28 serves to protect the occupant's knees during the condition in which the occupant is being flung forwardly if such are provided.

Figure 4:
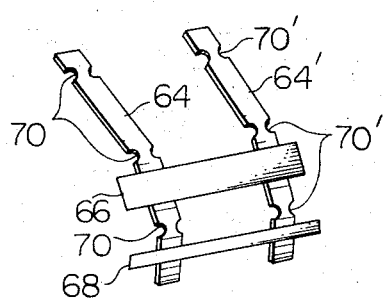
FIG. 4 is a perspective view showing another preferred form of the camber means applicable to the safety device shown in FIGS. 1 and 3.

FIG. 4 illustrates another preferred form of the camber means 24 to form part of the safety device 10 shown in FIGS. 1 and 3. The camber means herein shown includes a pair of spaced parallel strips 64 and 64' which are curved upwardly toward their substantially central portions thereby providing the camber 24a shown in FIG. 1. These strips 64 and 64' are secured at their front ends to the front end portions of the hollow body 20 and at the other ends to the rear end wall 20a of the hollow body 20. It is self-explanatory that the strips 64 and 64' thus arranged are further curved or warped upwardly at its central portion when their lower end portions attached to the rear end wall 20a of the hollow body 20 are pressed upon forwardly by the breast of the vehicle occupant during the frontal collision of the motor vehicle. Spaced lateral strips or cross members 66 and 68 may be attached to outer faces of the lower or rear portions of the strips 64 and 64' so as to efficiently receive the impact exerted on the rear end portion of the safety device. The strips 64 and 64' and/or the cross members 66 and 68 may preferably formed of a pliable material. If desired, moreover, the strips 64 and 64' may be formed with reduced portions 70 and 70' which are spaced from each other, thereby assisting in the warpage of the strips.

Figure 5:
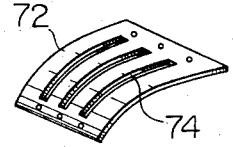
FIG. 5 is also a perspective view showing still another preferred form of the camber means of the safety device according to the present invention.

Another preferred form of the camber means 24 is illustrated in FIG. 5. The camber means herein shown in constituted by a curved pliable plate 72 which is formed with at least one elongated opening 74 extending in the fore-and-aft direction of the plate 72. The pliable plate 72 is herein exemplified as having three elongated openings 74 by way of example.

Having thus described some embodiments of the device according to the present invention, such embodiments can be varied or modified in numerous manners where desired. For instance, the camber means may be removed from the safety device if the resilient pad forming the cushioning means is so formed as to have in itself the camber substantially at its upper portion. The resilient pad is preferably formed of polyurethane which is sufficiently resileint in any direction and, for the purpose of absorbing the impact from the occupant's head at a satisfactory efficiency, hard polyurethane rubber will prove advantageous. It is, in this instance, desirable that the resilient pad of the polyurethane rubber may be slitted or split at its portion corresponding to the camber of the camber means so as to be readily deformed and raised from the collapsible hollow body. The impact absorbing means 28 and the resilient pad 30 attached thereto for the protection of the knees and feet of vehicle occupant are operable to prevent the occupant from being raised from the sitting posture.

What is claimed is:

1. A motor vehicle safety device for protecting a vehicle occupant from being injured at an upper part of the occupant's body when the occupant is flung forwardly in a motor vehicle, comprising collapsible means to be located in front of the vehicle occupant and collapsible forwardly of the motor vehicle when pressed upon by the breast of the vehicle occupant flung thereto, cushioning means attached at least rear and upper portions of said collapsible means and operable to be warped and projected in a direction to relieve the occupants head at its upper portion when said collapsible means is collapsed forwardly by a pressure from occupant's breast, further comprising camber means mounted in the portion of said cushioning means attached to said upper portion of said collapsible means, said camber means having an upper camber which is located over the upper portion of said collapsible means, said camber means being warped upwardly together with a portion of said cushioning means which is attached thereto for causing the upper portion of the cushioning means to be raised in unison with said camber means from the upper portion of the collapsible means for receiving the occupant's head when said collapsible means is collapsed forwardly, and said camber means comprises a pair of spaced parallel pliable strips embedded in side portions of said cushioning means and curved upwardly at thier central portions.

2. A motor vehicle safety device as set forth in claim 1, in which said camber means further comprises at least one cross member attached to outer faces of relatively rear portions of said pliable strips.

3. A motor vehicle safety device as set forth in claim 1, in which said pliable strips are secured at their front ends to a front end portion of said collapsible means and at their rear ends to a rear end portion of said collapsible means.

4. A motor vehicle safety device as set forth in claim 3, in which said pliable strips are formed with reduced portions which are spaced lengthwise from each other.

5. A motor vehicle safety device as set forth in claim 1, in which said camber means further comprises a pair of front arm elements secured to a front end portion of said collapsible means and pivotally connected to front end portions of said strips, a pair of rear arm elements pivotally connected at their front end portions to rear end portions of said strips, and a pair of mounts secured to a rear end portion of said collapsible means and pivotally connected to rear end portions of said strips in a manner to have their pivotal joints raised from the upper portion of said collapsible means.

6. A motor vehicle safety device as set forth in claim 1, in which said cushioning means comprises a resilient pad.

7. A motor vehicle safety device as set forth in claim 6, in which said resilient pad is formed of polyurethane rubber.

8. A motor vehicle safety device as set forth in claim 7, in which said resilient pad is formed of relatively hard polyurethane rubber.

9. A motor vehicle safety device as set forth in claim 8, in which said resilient pad has a lateral slit formed in the upper portion thereof.

10. A motor vehicle safety device as set forth in claim 1, in which said cushioning means is further attached to a lower portion of said collapsible means.

11. A motor vehicle safety device as set forth in claim 1, in which said collapsible means comprises a collapsible hollow body which is in the form of a bellows.

12. A motor vehicle safety device as set forth in claim 1, further comprising a wrapping member covering a substantially major portion of said cushioning means.

13. A motor vehicle safety device as set forth in claim 1, in which said collapsible means is securely connected to an instrument panel at its front end portions.

14. A motor vehicle safety device for protecting a vehicle occupant from being injured at an upper part of the occupant's body when the occupant is flung forwardly in a motor vehicle, comprising collapsible means to be located in front of the vehicle occupant and collapsible forwardly of the motor vehicle when pressed upon by the breast of the vehicle occupant flung thereto, cushioning means attached at least rear and upper portions of said collapsible means and operable to be warped and projected in a direction to relieve the occupant's head at its upper portion when said collapsible means is collapsed forwardly by a pressure from occupant's breast, further comprising camber means mounted in the portion of said cushioning means attached to said upper portion of said collapsible means, said camber means having an upward camber which is located over the upper portion of said collapsible means, said camber means being warped upwardly together with a portion of said cushioning means which is attached thereto for causing the upper portion of the cushioning means to be raised in unison with said camber means from the upper portion of the collapsible means for receiving the occupant's head when said collapsible means is collapsed forwardly, and said camber means comprises a pliable plate which is upwardly warped toward its central portion in a fore-and-aft direction of the plate.

15. A motor vehicle safety device as set forth in claim 14, in which said pliable plate has formed therein at least one elongated opening extending in said fore-and-aft direction.

16. A motor vehicle safety device for protecting a vehicle occupant from being injured at an upper part of the occupant's body when the occupant is flung forwardly in a motor vehicle, comprising collapsible means located in front of the vehicle occupant and collapsible forwardly of the motor vehicle when pressed upon by the breast of the vehicle occupant flung thereon, cushioning means attached to at least rear and upper portions of said collapsible means, and camber means mounted in the portion of said cushioning means attached to said upper portion of said collapsible means, said camber means having an upward camber which is located over the upper portion of said collapsible means, said camber means being warped and projected in a direction to receive the occupant's head together with a portion of said cushioning means which surrounds said camber means for causing the upper portion of the cushioning means to be raised in unison with said camber means from the upper portion of the collapsible means for receiving the occupant's head when said collapsible means is collapsed forwardly.

* * * * *